US011283128B2

(12) United States Patent
Kuroiwa et al.

(10) Patent No.: US 11,283,128 B2
(45) Date of Patent: Mar. 22, 2022

(54) LAMINATE, IN-VEHICLE BATTERY CONTAINING BODY, AND METHOD FOR PRODUCING IN-VEHICLE BATTERY CONTAINING BODY

(71) Applicant: HONDA MOTOR CO., LTD., Tokyo (JP)

(72) Inventors: Masaya Kuroiwa, Wako (JP); Ken Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 61 days.

(21) Appl. No.: 16/632,877

(22) PCT Filed: Aug. 28, 2018

(86) PCT No.: PCT/JP2018/031685
§ 371 (c)(1),
(2) Date: Jan. 22, 2020

(87) PCT Pub. No.: WO2019/044801
PCT Pub. Date: Mar. 7, 2019

(65) Prior Publication Data
US 2020/0212389 A1 Jul. 2, 2020

(30) Foreign Application Priority Data
Aug. 30, 2017 (JP) .............................. JP2017-165072

(51) Int. Cl.
*H01M 50/20* (2021.01)
(52) U.S. Cl.
CPC ........ *H01M 50/20* (2021.01); *H01M 2220/20* (2013.01)
(58) Field of Classification Search
None
See application file for complete search history.

(56) References Cited

U.S. PATENT DOCUMENTS

2013/0210303 A1 8/2013 Doi et al.
2015/0376353 A1* 12/2015 Takebe ..................... C08J 5/042
428/161

FOREIGN PATENT DOCUMENTS

CN 104781317 7/2015
JP 54-148884 11/1979
(Continued)

OTHER PUBLICATIONS

Chinese Office Action for corresponding CN Application No. 201880038227.1, dated Mar. 24, 2021.
(Continued)

*Primary Examiner* — Wyatt P McConnell
(74) *Attorney, Agent, or Firm* — Mori & Ward, LLP (57) ABSTRACT

An object of the present invention is to provide: a laminate which is capable of satisfying two requirements, namely, weight reduction and fire resistance at the same time; an in-vehicle battery containing body; and a method for producing an in-vehicle battery containing body. In order to achieve the object, a laminate 5 according to the present invention includes at least a first layer 51 containing a thermoplastic or thermosetting resin and a second layer 52 containing an incombustible or flame-retardant nonwoven fabric. The first layer and the second layer form an integrally molded article in which at least part of the resin of the first layer melting to combine and integrated with the second layer. An in-vehicle battery containing body 1 includes containing bodies 2, 4 for containing an in-vehicle battery 3, and at least a portion of the containing bodies 2, 4 is formed by a laminate 5. At least two layers, namely a first layer 51 and a second layer 52, are laminated on each other, and then, integrally molding at the same time such that at least a portion of the resin of the first layer 51 is melted and combined with the second layer 52.

4 Claims, 7 Drawing Sheets

(56) References Cited

FOREIGN PATENT DOCUMENTS

| | | |
|---|---|---|
| JP | 55-086748 | 6/1980 |
| JP | 57-196735 U | 6/1981 |
| JP | 61-086244 | 5/1986 |
| JP | 2000-348695 | 12/2000 |
| JP | 2010-031257 | 2/2010 |
| JP | 2010-229238 | 10/2010 |
| JP | 2012-179892 | 9/2012 |
| JP | 2014-062189 | 4/2014 |
| JP | 2014-172201 | 9/2014 |

OTHER PUBLICATIONS

International Search Report for corresponding International Application No. PCT/JP2018/031685, dated Oct. 9, 2018.
Written Opinion for corresponding International Application No. PCT/JP2018/031685, dated Oct. 9, 2018.
"Practical Handbook of Engineering Materials, vol. 7: Plastic Transparent Materials and Insulating Materials", "Practical Handbook of Engineering Materials", Editorial Committee, p. 73, Beijing: China Standard Publishing Co., Jun. 2002.
"Polymer Physics Basic Plastic Molding Technology Principles Shanxi Plastics", Shanxi Society of Plastic Engineering, etc., 1981, p. 113.
Chinese Office Action for corresponding CN Application No. 201880038227.1, dated Oct. 11, 2021 (w/ English machine translation).

\* cited by examiner

LAMINATE, IN-VEHICLE BATTERY CONTAINING BODY, AND METHOD FOR PRODUCING IN-VEHICLE BATTERY CONTAINING BODY

TECHNICAL FIELD

The present invention relates to a laminate, an in-vehicle battery containing body, and a method for producing such an in-vehicle battery containing body.

BACKGROUND ART

Vehicles such as hybrid vehicles and electric vehicles are equipped with a battery containing body having therein a plurality of battery modules. The battery containing body is composed of a tray in which the plurality of battery modules is accommodated, and a cover which covers an upper portion of the tray. Generally, the tray and the cover are each formed from a resin, a steel panel, or an aluminum panel to ensure predetermined strength and stiffness.

Patent Document 1: Japanese Unexamined Patent Application, Publication No. 2000-348695

DISCLOSURE OF THE INVENTION

Problems to be Solved by the Invention

In recent years, from the viewpoint of vehicle safety, the in-vehicle battery containing bodies have been required to have predetermined fire resistance. In addition, due to a recent demand for fuel efficiency, weight reduction of the in-vehicle battery containing bodies has also been demanded, and thus measures addressing this have become necessary.

It is conceivable to use aluminum or carbon-fiber-reinforced plastics (CFRP) as the material constituting the tray and the cover of the battery containing body, from the viewpoint of ensuring a predetermined mechanical strength while at the same time reducing the weight. However, since aluminum has a lower melting point than iron, it is necessary to increase the thickness in order to ensure fire resistance, and thus the weight increases. On the other hand, CFRP advantageously contributes to the weight reduction, but is flammable due to being resin. Therefore, it is difficult for both materials to satisfy the two requirements of weight reduction and fire resistance at the same time.

It is also conceivable to use a laminate formed by laminating aluminum and CFRP. However, in order to laminate these different types of materials, the materials need to be bonded to each other with an adhesive applied therebetween, or to be fastened to each other with fastening members such as rivets. For this reason, there have been problems in that production of the laminate is complicated, which leads to an increase in the manufacturing costs. In addition, the use of an adhesive or fastening member also has a problem in that the weight increases. Accordingly, there has been an increasing demand for a material for a fire-resistant containing body and an in-vehicle battery containing body that can satisfy the two requirements of weight reduction and fire resistance at the same time, and that can be produced easily.

It is, therefore, an object of the present invention to provide a laminate that is resistant to fire, light in weight, and can be easily produced. It is another object of the present invention to provide an in-vehicle battery containing body that is resistant to fire, light in weight, and can be easily produced. It is a yet another object of the present invention to provide a method which can easily produce an in-vehicle battery containing body that is resistant to fire and light in weight.

Means for Solving the Problems

A first aspect of the present invention is directed to a laminate (e.g., a laminate 5 to be described later) including at least a first layer (e.g., a first layer 51 to be described later) containing a thermoplastic or thermosetting resin; and a second layer (e.g., a second layer 52 to be described later) containing an incombustible or flame-retardant nonwoven fabric. The first layer and the second layer form an integrally molded article in which at least part of the resin constituting the first layer melted to combine and integrated with the second layer.

According to the first aspect of the present invention, it is unnecessary to combine the first layer with the second layer by bonding them together using, for example, an adhesive, or by fastening them together using fastening members such as rivets. This feature makes it possible to provide a laminate that has fire resistance exhibited by the second layer constituted by an incombustible or flame-retardant nonwoven fabric, and that is lightweight and easy to produce.

According to a second aspect of the present invention, in the laminate as described in the first aspect, the thermoplastic or thermosetting resin may be a fiber reinforced resin.

According to the second aspect of the present invention, since the first layer can be increased in strength, the laminate including the first and second layers combined and integrated with each other can have an increased strength and increased durability.

According to a third aspect of the present invention, in the laminate as described in the first or second aspect, the nonwoven fabric may be formed by at least any one of glass fibers, carbon fibers, and graphite fibers.

According to the third aspect of the present invention, the nonwoven fabric can be increased in strength. Combining and integrating the second layer with the first layer can further increase the strength and the durability of the laminate.

A fourth aspect of the present invention is directed to an in-vehicle battery containing body (e.g., an in-vehicle battery containing body 1 to be described later), wherein at least part of a containing body (e.g., a tray 2 and a cover 4 to be described later) for containing an in-vehicle battery (e.g., a battery module 3 to be described later) is formed by the laminate according any one of the first to third aspects.

According to the fourth aspect, an in-vehicle battery containing body can be provided which has fire resistance exhibited by the second layer constituted by an incombustible or flame-retardant nonwoven fabric, and which is lightweight and easy to produce.

According to a fifth aspect of the present invention, in the in-vehicle battery containing body as described in the fourth aspect, the containing body includes a tray (e.g., a tray 2 to be described later) and a cover (e.g., a cover 4 to be described later) formed from the laminate, and wherein at least one of an inner surface or an outer surface of at least one of the tray or the cover may be the second layer.

According to the fifth aspect, the second layer of the laminate can be arranged in accordance with the orientation of the surface for which fire resistance is demanded.

A sixth aspect of the present invention is directed to a method for producing an in-vehicle battery containing body wherein at least part of a containing body (e.g., a tray 2 and a cover 4 to be described later) for containing an in-vehicle battery (e.g., a battery module 3 to be described later) is formed by a laminate (e.g., a laminate 5 to be described later). The method includes forming the laminate by laminating at least two layers including a first layer (e.g., a first layer 51 to be described later) containing a thermoplastic or thermosetting resin and a second layer (e.g., a second layer 52 to be described later) containing an incombustible or flame-retardant nonwoven fabric, followed by integrally molding the first layer and the second layer at the same time so as to melt at least a portion of the resin of the first layer to combine with the second layer.

According to the sixth aspect of the present invention, it is possible to provide a production method which can easily produce an in-vehicle battery containing body that has fire resistance exhibited by the second layer constituted by an incombustible or flame-retardant nonwoven fabric, and that is lightweight and can be easily produced.

According to a seventh aspect of the present invention, the method for producing an in-vehicle battery containing body as described in the sixth aspect may further include: setting the second layer on a press mold (e.g., a male mold 61, a female mold 62 to be described later); setting the first layer on the second layer; and subsequently pressing the first layer and the second layer simultaneously to integrally mold the first layer and the second layer.

According to the seventh aspect of the present invention, the first and second layers of the laminate can be laminated on, and integrated with, each other in a single step. This feature can reduce the number of steps of laminating the first and second layers, and makes it possible to easily produce an in-vehicle battery containing body at reduced costs, the in-vehicle battery containing body being composed of a thermoplastic resin and having the second layer of a nonwoven fabric as the outer surface.

According to an eighth aspect of the present invention, the method for producing an in-vehicle battery containing body as described in the sixth aspect may further include: setting the second layer on a press mold; setting the first layer on the second layer; and subsequently pressing the first layer and the second layer simultaneously to integrally mold the first layer and the second layer.

According to the eighth aspect of the present invention, the first and second layers of the laminate can be laminated on, and integrated with, each other in a single step. This feature can reduce the number of steps of laminating the first and second layers, and makes it possible to easily produce an in-vehicle battery containing body at reduced costs, the in-vehicle battery containing body being composed of a thermosetting resin and having the second layer of a nonwoven fabric as the inner surface.

According to a ninth aspect of the present invention, the method for producing an in-vehicle battery containing body as described in the sixth aspect may further include: setting the second layer on a press mold; setting the first layer on the second layer; setting another sheet of the second layer on the first layer; and subsequently pressing the second layer, the first layer, and the other sheet of the second layer simultaneously to integrally mold the second layer, the first layer, and the other sheet of the second layer.

According to the ninth aspect, in which the three layers including the second layer, the first layer, and the other second layer are simultaneously pressed and integrally molded with each other, a laminate including three layers can be produced as an integrally molded article in a single step, and the number of steps for laminating the layers can be reduced. This feature makes it possible to easily produce an in-vehicle battery containing body at reduced costs, the in-vehicle battery containing body having fire resistance with respect to both the inside and outside.

Effects of the Invention

The present invention provides a laminate that is resistant to fire, light in weight, and can be easily produced.

In addition, the present invention provides an in-vehicle battery containing body that is resistant to fire, light in weight, and can be easily produced.

Furthermore, the present invention provides a method for producing an in-vehicle battery containing body that is resistant to fire, light in weight, and can be easily produced.

PREFERRED MODE FOR CARRYING OUT THE INVENTION

Figure 1:
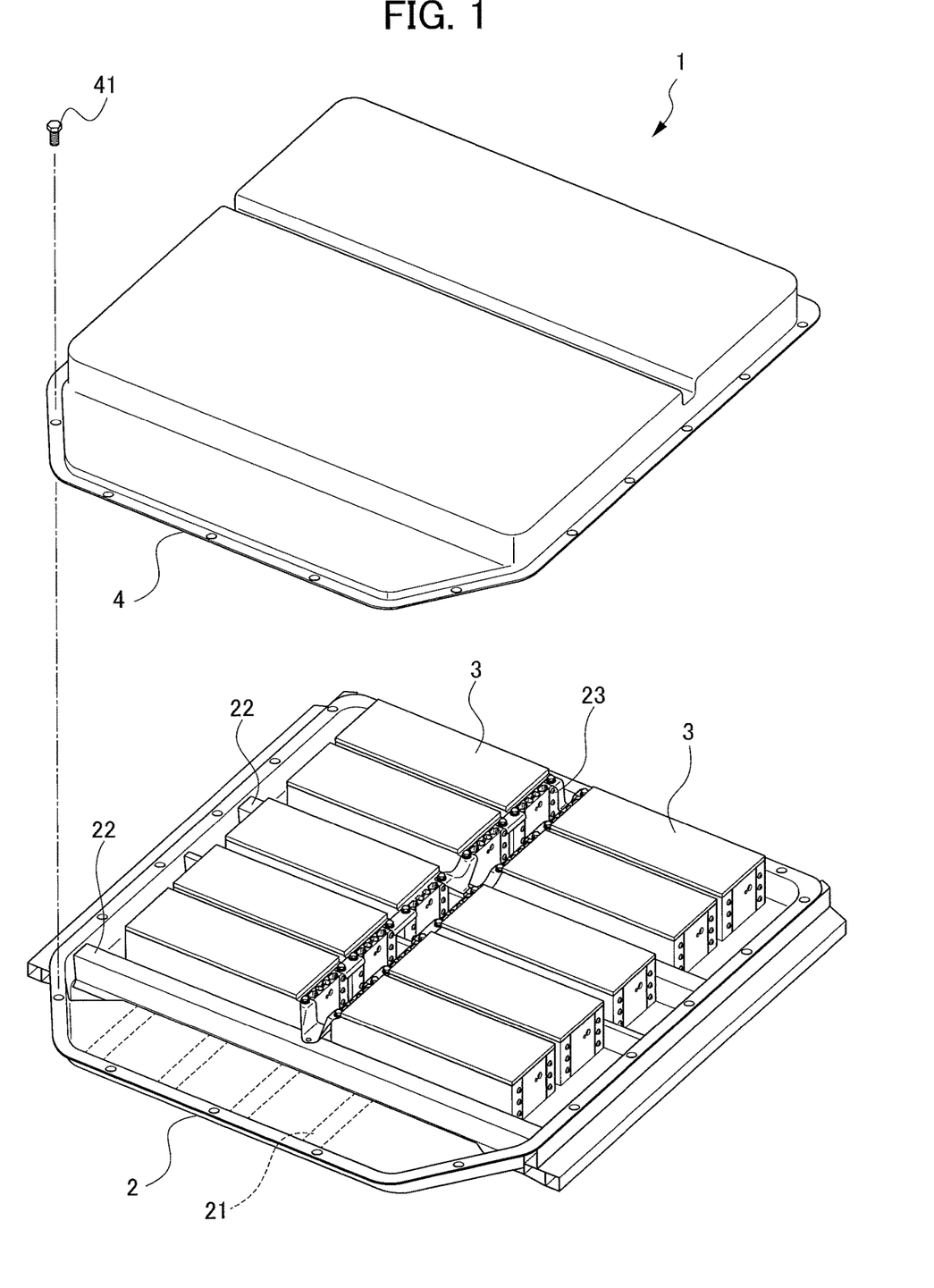
FIG. 1 is a perspective view showing an example of an in-vehicle battery containing body formed from a laminate according to the present invention.

Embodiments of the present invention will be described below with reference to the drawings. FIG. 1 is a perspective view showing an example of an in-vehicle battery containing body formed from a laminate of the present invention. The in-vehicle battery containing body 1 of the present embodiment is intended to be arranged, for example, below a floor panel of an electric vehicle, and includes a tray 2, a plurality of battery modules 3 as an in-vehicle battery accommodated in the tray 2, and a cover 4 that covers an upper portion of the tray 2. FIG. 1 shows a state in which the cover 4 is detached.

The tray 2 has a substantially flat dish shape, and is provided with a plurality of cross members 21 and 22 that function as reinforcing members and are arranged in directions intersecting with each other.

Each of the battery modules 3 has a rectangular parallelepiped shape and includes a plurality of flat battery cells (not shown) stacked on each other. Two of the battery modules 3 that are adjacent to each other in the longitudinal direction of the battery modules 3 are connected to each other via a connecting member 23, and are fixed to the cross member 22 via the connecting member 23. In this in-vehicle battery containing body 1, five sets of two battery modules 3 connected via the connecting member 23 are arranged side-by-side in the transverse direction of the battery modules 3. Thus, ten battery modules 3 in total are arranged in a matrix and fixed to the inside of the tray 2.

The cover 4 has a substantially flat dish shape that is substantially the same as the planar shape of the tray 2. The cover 4 is attached to the upper surface of the tray 2 with a plurality of bolts 41 (only one of which is shown in FIG. 1) so as to cover an upper portion of the tray 2 and upper portions of the battery modules 3. Thus, the battery modules 3 are accommodated in the interior space of the containing body composed of the tray 2 and the cover 4.

In the in-vehicle battery containing body 1, the tray 2 and the cover 4 are formed, at least partially, and preferably entirely, by a laminate intended for a fire-resistant containing body. This laminate will be described below.

Figure 2:
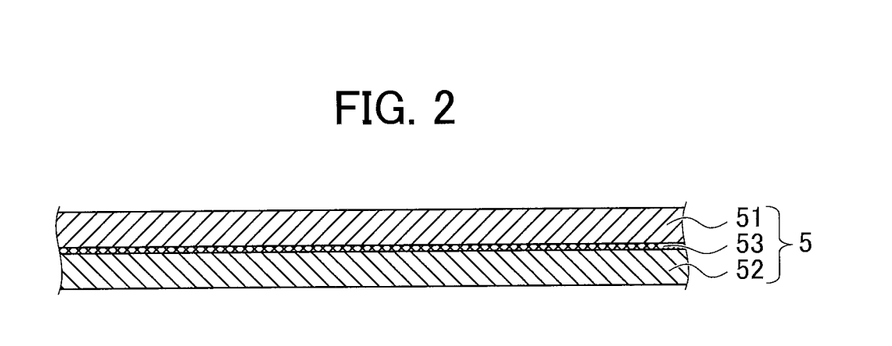
FIG. 2 is an enlarged cross-sectional view showing an example of a laminate according to the present invention.

FIG. 2 is an enlarged cross-sectional view showing an example of a laminate according to the present invention. The laminate 5 has at least two layers, namely a first layer 51 and a second layer 52. The first layer 51 and the second layer 52 are laminated and integrated into the laminate 5 as an integral molded article.

The first layer 51 is constituted by a resin sheet containing a thermoplastic or thermosetting resin, and exclusively imparts shape retaining properties to the laminate 5 when the laminate 5 is formed into a fire-resistant containing body having a predetermined shape. On the other hand, the second layer 52 is constituted by an incombustible or flame-retardant nonwoven fabric, and imparts, with its heat-insulating and flame-shielding effects, predetermined fire resistance to the laminate 5 when the laminate 5 is formed into a fire-resistant containing body having a predetermined shape. Use of the second layer 52, which exhibits fire resistance and is constituted by a nonwoven fabric, makes it possible to configure the laminate 5 to be light in weight.

In a layered state, the first layer 51 and the second layer 52 are integrated with each other by the resin of the first layer 51 melting to combine with the second layer 52. Specifically, in a melted state, the resin constituting the first layer 51 penetrates between the fibers of the nonwoven fabric constituting the second layer 52 to be entwined with the fibers. The melted resin then cools to solidify while entwined with the fibers, thereby combining to be integrated with the fibers. As a result, at the boundary between the first layer 51 and the second layer 52 of the laminate 5, the resin of the first layer 51 and the fibers of the second layer 52 are combined and integrated with each other to form a combined layer 53. Since the second layer 52 is constituted by the nonwoven fabric, the melted resin of the first layer 51 easily penetrates between the fibers and easily entwines with the fibers. Therefore, the laminate 5 is formed into a sheet including the first layer 51 and the second layer 52 that have been firmly combined and integrated with each other.

The resin constituting the first layer 51 does not necessarily have to be entirely melted. It is suitable for at least a portion of the resin to be melted. More specifically, among the resin constituting the first layer 51, at least a part of the resin in contact with the second layer 52 is melted, so that the melted resin penetrates between the fibers of the nonwoven fabric constituting the second layer 52. As a result, the first layer 51 and the second layer 52 can be combined with each other at the boundary therebetween, thereby achieving firm integration between the first and second layers 51 and 52.

In this way, the laminate 5 is constituted by an integrally molded article including the first layer 51 and the second layer 52 integrated with each other through at least part of the resin of the first layer 51 melting and combining with the second layer 52. Therefore, it is no longer necessary to adhesively integrate the first layer 51 and second layer 52 via an adhesive or via an additional adhesive layer of an adhesive film or the like, or by fastening them together using fastening members such as rivets. As a result, the laminate 5 has a lightweight configuration without any increase in weight, and can be easily produced. Thus, the laminate 5 has fire resistance exhibited by the second layer 52 of the incombustible or flame-retardant nonwoven fabric, and is lightweight and can be easily to produce.

In addition, since the laminate 5 is an integrally molded article formed by integrally molding the first layer 51 and the second layer 52, the number of steps of laminating and integrating the first layer 51 and the second layer 52 can be reduced. As a result, the manufacturing costs of the laminate 5 can also be reduced.

Specific examples of the thermoplastic resin constituting the first layer 51 of the laminate 5 include, but are not particularly limited to, fiber-reinforced resins containing fibers impregnated with a thermoplastic resin. Non-limiting examples of the thermoplastic resin include polypropylene, polyamide 6, and polycarbonate. Non-limiting examples of the fibers include glass fibers and carbon fibers in a chopped discontinuous fiber state or in a continuous fiber state such as a UD tape or a woven sheet. Among these, from the viewpoint of weight reduction and mass productivity, it is preferable to use a fiber-reinforced resin containing fibers in a chopped discontinuous fiber state.

Specific examples of the thermosetting resin constituting the first layer 51 of the laminate 5 include, but are not particularly limited to, fiber reinforced resins containing fibers impregnated with a thermosetting resin. Non-limiting examples of the thermosetting resin include phenol resin, epoxy resin, polyurethane resin, and unsaturated polyester resin. Non-limiting examples of the fibers include glass fibers and carbon fibers in a chopped discontinuous fiber state or in a continuous fiber state such as a UD tape or a woven sheet. Among these, from the viewpoint of weight reduction and mass productivity, it is preferable to use a fiber-reinforced resin containing fibers in a chopped discontinuous fiber state.

The thickness of the first layer 51 of the laminate 5 can be appropriately set in consideration of a strength required in accordance with, for example, the size of the containing body and the weight of a target to be contained.

The thermoplastic resin or the thermosetting resin constituting the first layer 51 may be a fiber reinforced resin whose strength is improved by fibers mixed therein, as described above. Use of the fiber reinforced resin as the material for the first layer 51 can improve the strength and the durability of the first layer 51. As a result, the laminate 5 can be improved in strength and durability. Further, if the strength and the durability of the laminate 5 do not need to be varied, the laminate 5 can be formed to be thin, whereby further weight reduction can be achieved.

The reinforcing fibers mixed in the resin are not particularly limited, and examples thereof include glass fibers, carbon fibers, and graphite fibers. Use of these reinforcing fibers improves the first layer 51 in heat resistance, in addition to strength and durability. Therefore, the fire resistance of the laminate 5 can be further improved.

The nonwoven fabric constituting the second layer 52 is not particularly limited as long as being incombustible or flame retardant. However, a nonwoven fabric formed by at least any one of glass fibers, carbon fibers, and graphite fibers can be preferably used. All of these fibers are usable as reinforcing fibers, and at the same time, contribute to improving the strength of the nonwoven fabric. Therefore, the strength and the durability of the laminate 5 can be further improved. In addition, since the thickness and the basis weight of a nonwoven fabric can be easily adjusted, a desired fire resistance can be easily obtained through adjustment of the thickness and the basis weight. Furthermore, the nonwoven fabric can additionally impart soundproofing capability to the laminate 5.

Figure 3:
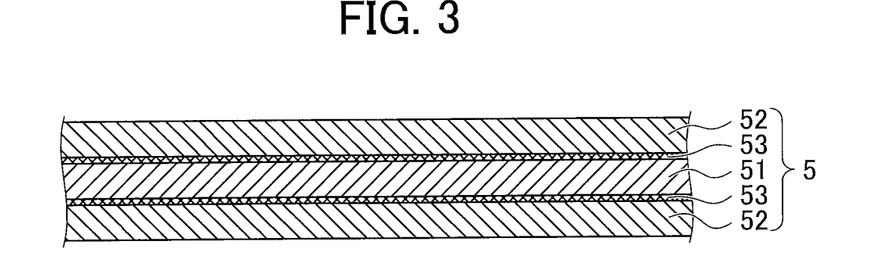
FIG. 3 is an enlarged cross-sectional view showing another example of a laminate according to the present invention.

The number of layers of the laminate 5 is not limited to two. As shown in FIG. 3, the laminate 5 may have a three-layer structure. In other words, the laminate 5 may include a first layer 51 and second layers 52, 52 that are laminated on, and integrated with, the front and back surfaces of the first layer 51. In this case, combined layers 53, 53 are formed at the respective boundaries between the first layer 51 and the two second layers 52, 52. Since both surfaces of the laminate 5 can thereby exhibit fire resistance due to the second layers 52, 52, it is unnecessary to consider the orientation of the second layer 52 upon use of the laminate 5.

Figure 7:
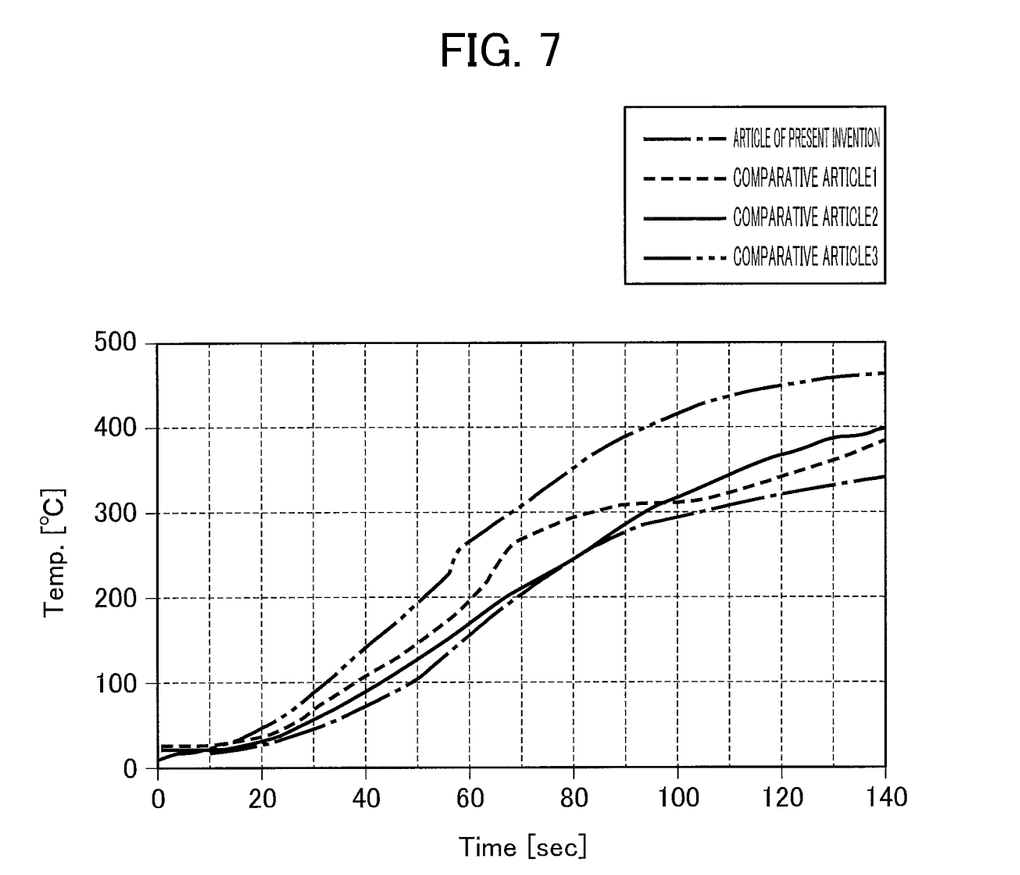
FIG. 7 is a graph showing results of a fire resistance test.
Figure 8:
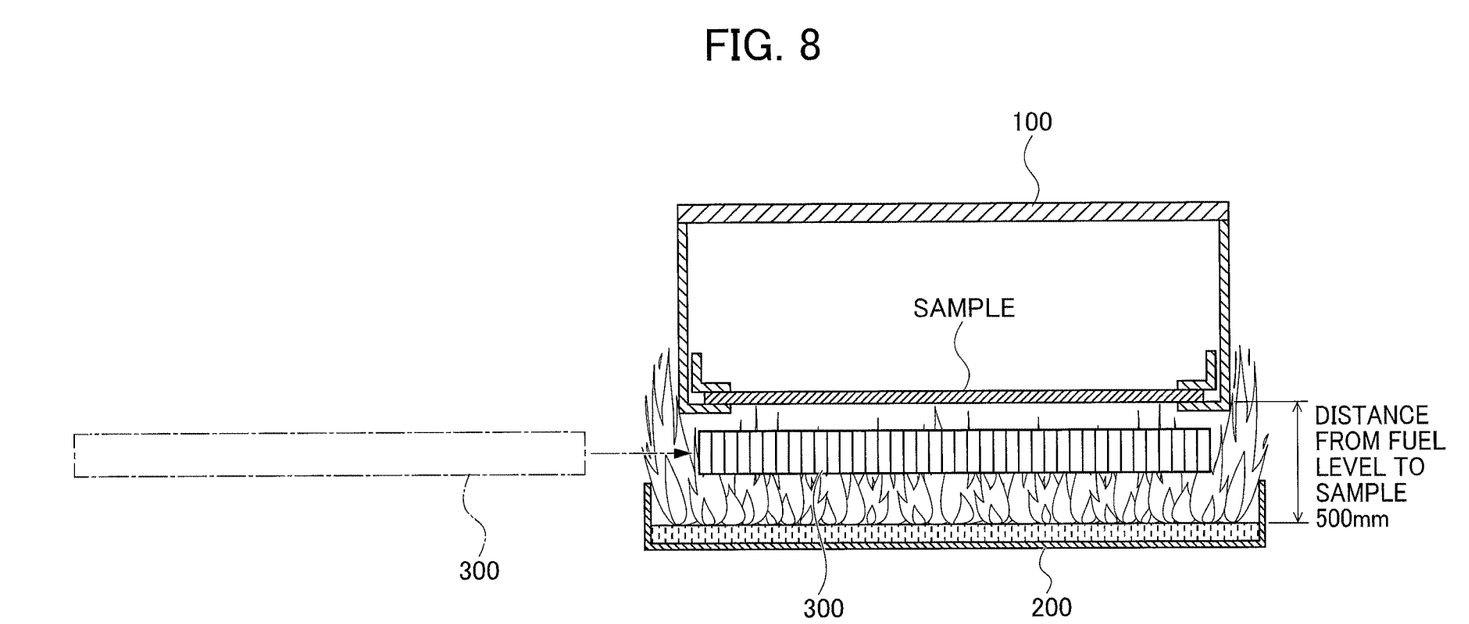
FIG. 8 is a diagram for explaining a fire resistance test method.

Here, the fire resistance of the second layer 52 of the laminate 5 of the present invention will be described. FIG. 7 is a graph showing temperature changes of a product of the present invention and comparative articles 1 to 3 that were tested for fire resistance. FIG. 8 shows an apparatus used in the fire resistance test. The apparatus includes: a fireproof box 100 composed of an iron casing having a bottom with an opening; a tray 200 on which gasoline was poured; and a fire brick 300. Each of the samples (the article of present invention and the comparative articles 1 to 3) was arranged in the fireproof box 100 so as to close the opening of the bottom of the fireproof box 100. The fire brick 300 has through holes of ϕ 30, the through holes being arranged at a pitch of 40 mm.

In the fire resistance test, the gasoline in the tray 200 was first ignited while the fire brick 300 was not yet arranged in place. Thereafter, the fireproof box 100 was arranged above the tray 200 so that the sample was positioned at a height of 500 mm from the fuel level so that the sample was exposed to flames. After the lapse of 70 seconds, the fire brick 300 was inserted between the tray 200 and the sample, as shown in FIG. 8. The exposure to flames was continued for further 60 seconds. The distance between the fire brick 300 and the sample was 400 mm. The changes in temperature of each sample were measured from the moment when the sample had been placed using a temperature sensor attached to the top surface of each sample (i.e., the surface opposite to the surface exposed to flames).

The article of the present invention is a laminate prepared by laminating a first layer consisting of a fiber reinforced thermoplastic resin sheet, and an incombustible graphite fiber nonwoven fabric (with a basis weight of 0.7 kg/m² and a thickness of 6.0 mm) serving as a second layer. The comparative article 1 is a laminate prepared using an aluminum panel having a thickness of 3.0 mm (8.1 kg/m²) in place of the second layer of the article of the present invention, and bonding the fiber reinforced resin sheet and the aluminum panel with an adhesive. The comparative article 2 is a laminate prepared using an aluminum panel having a thickness of 2.0 mm (5.4 kg/m²) in place of the second layer of the article of the present invention, and bonding the fiber reinforced resin sheet and the aluminum panel with an adhesive. The comparative article 3 is a single-layer sheet consisting solely of the same fiber reinforced resin sheet as the first layer of the article of the present invention. The article of the present invention was exposed to flames at the surface composed of the nonwoven fabric. The comparative articles 1 and 2 were exposed to flames at the surface composed of the aluminum panel.

As shown in FIG. 7, the comparative article 3 increased in temperature with the passage of time. On the other hand, the article of the present invention and the comparative articles 1 and 2 experienced a smaller increase in temperature, and produced approximately the same result. Thus, it was found that the nonwoven fabric of the present invention has substantially the same degree of heat insulation as that of the aluminum panels of the comparative articles 1 and 2. In addition, the comparative articles 1 to 3 continued to burn from the fiber reinforced resin sheet or from a gap between jigs for at least two minutes subsequent to the end of the exposure to flames; whereas, the article of the present invention did not burn subsequent to the end of the exposure to flames, whereby it was found to have fire resistance. Furthermore, the article of the present invention, which includes no aluminum panel and does not need to be bonded with an adhesive, is much more lightweight than the comparative articles 1 and 2, and is easy to produce because it is an integrally molded article. Therefore, it was found that the laminate 5 is lightweight, while having heat insulation and fire resistance that are equivalent to those of an aluminum panel, and can be easily produced.

The tray 2 and the cover 4 of the in-vehicle battery containing body 1 of the present invention are formed from the laminate 5 described above. Therefore, the in-vehicle battery containing body 1 is heat insulating and fire resistant, is lightweight, and can be easily to produced.

In the present embodiment, among the respective layers 51, 52 of the laminate 5, which forms the tray 2 and the cover 4 as the containing body, the second layer 52 constituted by the incombustible or flame-retardant nonwoven fabric is arranged so as to be the outer surface (which is opposite to the surface to face the battery modules 3 to be contained). As a result, the entire surface of the in-vehicle battery containing body 1 is capable of exhibiting fire resistance.

For example, if special consideration needs to be given to the fire resistance with respect to the battery modules 3 to be provided inside, the laminate 5 may be arranged such that the second layer 52 forms the inner surface (that is to face the battery modules 3 to be contained) of the tray 2 and the cover 4.

Further, depending on the orientation of the surface for which fire resistance is required, the second layer 52 may form different surfaces of the tray 2 and the cover 4. Specifically, the laminate 5 forming the tray 2 may be arranged such that the second layer 52 forms the outer surface of the tray 2; whereas, the laminate 5 forming the cover 4 may be arranged such that the second layer 52 forms the inner surface of the cover 4.

The laminate 5 having the three-layer structure shown in FIG. 3 may be used to form the tray 2 and the cover 4. In this case, since the inner and outer surfaces of the laminate 5 both exhibit fire resistance, the in-vehicle battery containing body 1 can be obtained which has fire resistance with respect to both of the inside and outside.

Next, a method for producing the in-vehicle battery containing body 1 of the present invention will be described. In the present invention, the laminate 5 to form the tray 2 and the cover 4 of the in-vehicle battery containing body 1 is produced by laminating the at least two layers of the first layer 51 and the second layer 52, followed by at least a portion of the resin of the first layer 51 being melted so as to combine with the second layer 52, thereby integrally molding the first layer 51 and the second layer 52. Using the laminate 5 in the tray 2 and the cover 4 to constitute the in-vehicle battery containing body 1 makes it possible to easily produce the in-vehicle battery containing body 1 that is resistant to fire and light in weight.

Specific examples of the method for producing the tray 2 and the cover 4 using the laminate 5 include a press molding method using a press molding machine. A method of producing the tray 2 and the cover 4 for the in-vehicle battery containing body 1 by the press molding method will be described hereinafter.

<First Production Method>

Figure 4:
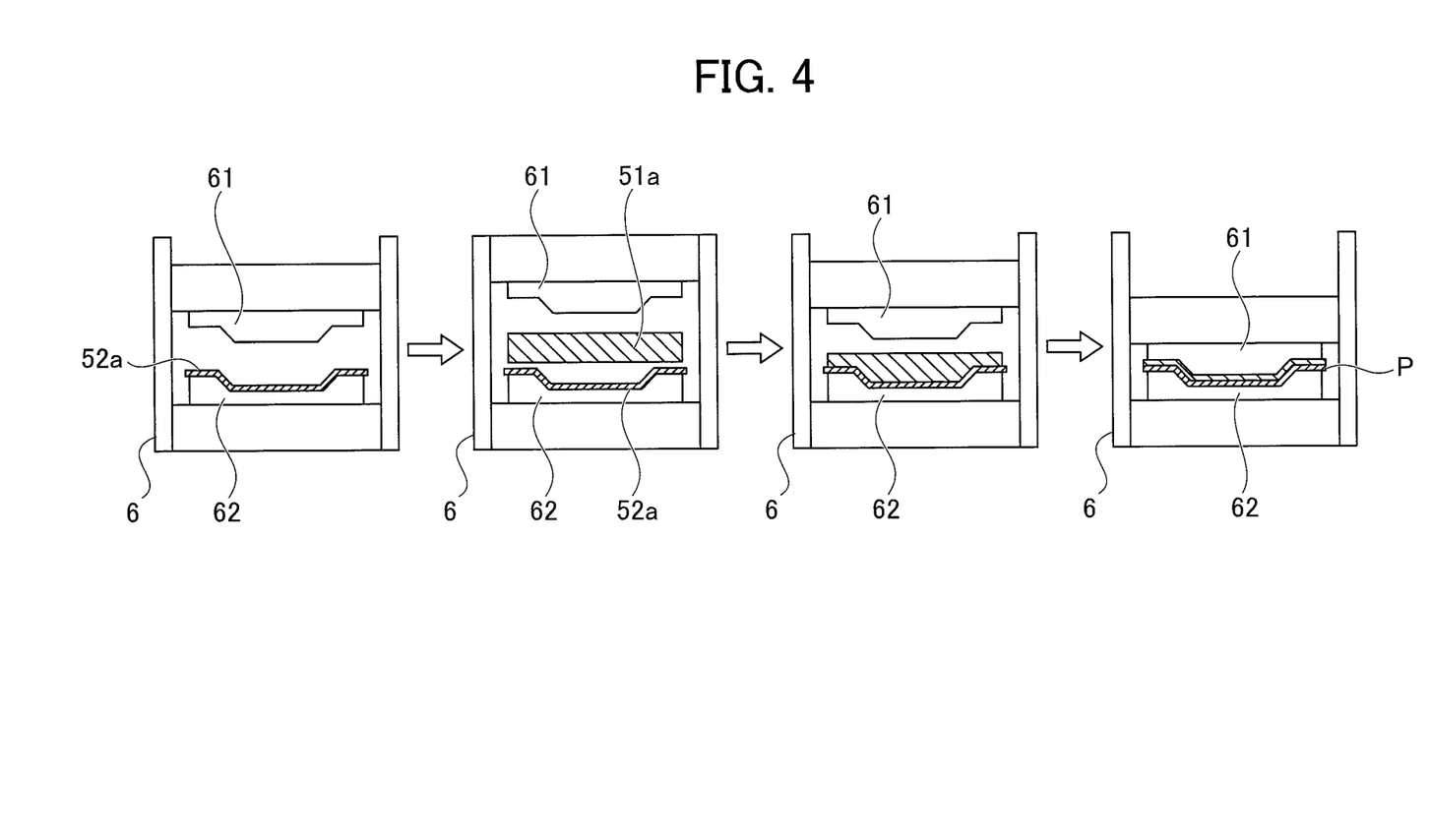
FIG. 4 illustrates an example of a step of producing a tray and a cover of an in-vehicle battery containing body using a press molding machine.

FIG. 4 illustrates an example of a step of producing the tray 2 and the cover 4 for the in-vehicle battery containing body 1 using a press molding machine 6. First, a case where the first layer 51 of laminate 5 is constituted by a thermoplastic resin will be described.

A pair of upper and lower press molds (male mold 61 and female mold 62) of the press molding machine 6 is opened, and a nonwoven fabric 52a, which is to constitute the second layer 52 of the laminate 5, is set on the female mold 62. Next, a resin sheet 51a, which is to constitute the first layer 51 of laminate 5, is placed on the nonwoven fabric 52a. It should be noted that the resin sheet 51a placed on the nonwoven fabric 52a has been softened by being heated in advance (preheated) for about one to two minutes to a predetermined temperature by a heating furnace emitting infrared rays or the like.

Thereafter, the male mold 61 is moved downward, so that the nonwoven fabric 52a and the resin sheet 51a are simultaneously pressed (pressurized) at a predetermined pressure between the male mold 61 and the female mold 62, thereby shaping the nonwoven fabric 52a and the resin sheet 51a into a predetermined shape of the tray 2 or the cover 4. At this time, the resin constituting the resin sheet 51a that is located at a boundary portion with the nonwoven fabric 52a is further softened and melted by the pressing, penetrates between the fibers of the nonwoven fabric 52a, and entwines with the fibers, thereby combining with the nonwoven fabric 52a to be integrated.

The resin sheet 51a pressed between the male mold 61 and the female mold 62 is cured by being gradually cooled to a mold temperature, while undergoing shaping between the male mold 61 and the female mold 62. As a result, a product P of a predetermined shape is obtained which is formed of the laminate 5 in which the first layer 51 and the second layer 52 firmly laminated and integrated with each other. The obtained product P is machined into the tray 2 or the cover 4 through secondary machining such as trimming of the outer periphery and drilling of bolt holes.

According to the first production method, since the first layer 51 and the second layer 52 are simultaneously pressed and integrally molded with each other, a lightweight laminate 5 having fire resistance and composed of the first layer 51 and the second layer 52 can be produced as an integrally molded article in a single step. Thus, the number of steps of laminating the first layer 51 and the second layer 52 can be reduced. This feature makes it possible to easily produce the in-vehicle battery containing body 1 at reduced costs, the in-vehicle battery containing body 1 being composed of a thermoplastic resin and having the second layer 52 of a nonwoven fabric as the outer surface.

In a case where the first layer 51 of the laminate 5 is constituted by a thermosetting resin, molds having a heating mechanism such as a heater are suitably used as the pair of upper and lower press molds (male mold 61 and female mold 62). The pressing can be suitably performed by placing the resin sheet 51a at room temperature on a nonwoven fabric 52a set on the female mold 62, and thereafter, by pressing the resin sheet 51a and the nonwoven fabric 52a using the male mold 61 and the female mold 62 while heating is performed so that the resin sheet 51a reaches the curing temperature.

As a result, a lightweight laminate 5 having fire resistance and composed of the first layer 51 and the second layer 52 can be produced as an integrally molded article in a single step, as in the method described above. Thus, the number of steps of laminating the first layer 51 and the second layer 52 can be reduced. This feature makes it possible to easily produce an in-vehicle battery containing body 1 at reduced costs, the in-vehicle battery containing body 1 being composed of a thermosetting resin.

<Second Production Method>

Figure 5:
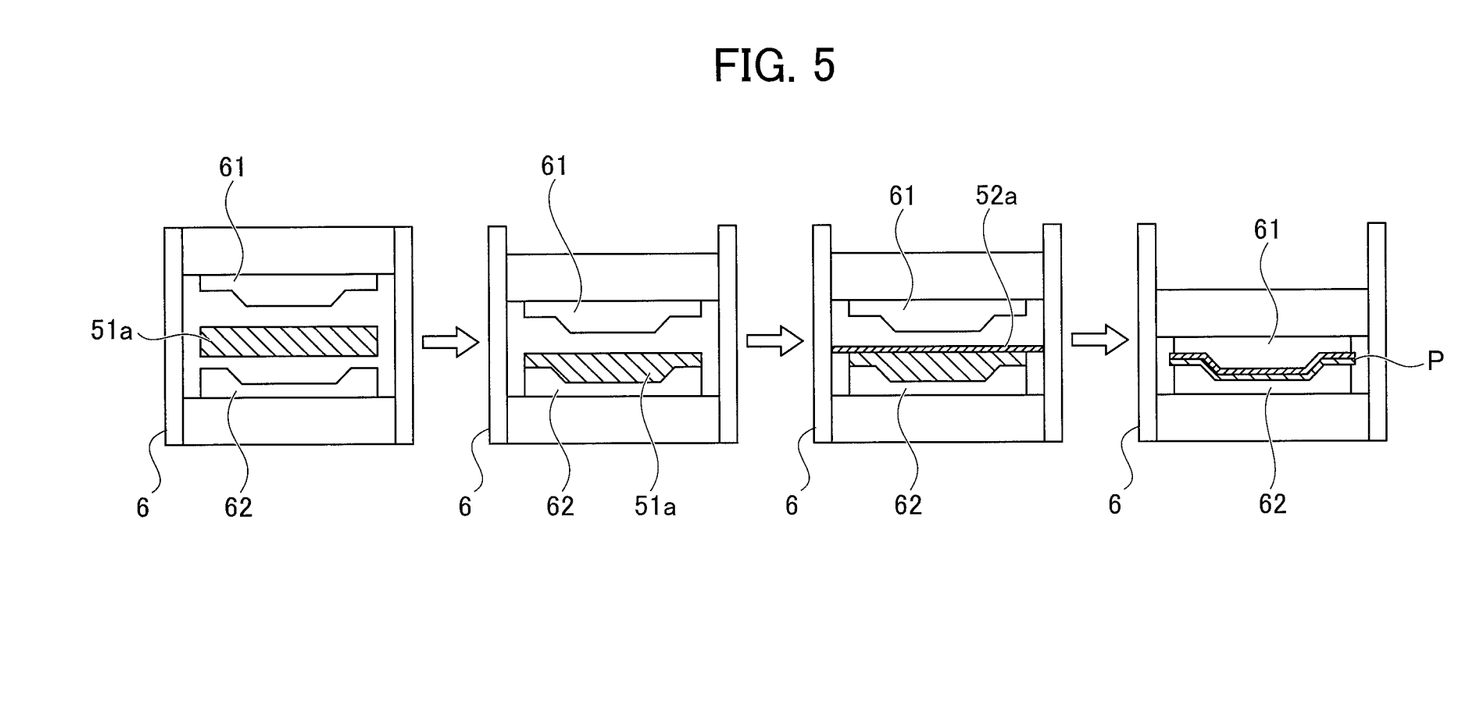
FIG. 5 illustrates another example of a step of producing a tray and a cover of an in-vehicle battery containing body using a press-molding machine.

FIG. 5 illustrates another example of a step of producing the tray 2 and the cover 4 of the in-vehicle battery containing body 1 using a press molding machine 6.

A pair of upper and lower press molds (male mold 61 and female mold 62) of the press molding machine 6 is opened, and a resin sheet 51a, which is to constitute the first layer 51 of the laminate 5, is set on the female mold 62. As in the method described above, the resin sheet 51a has been softened by being heated in advance (preheated) for about one to two minutes to a predetermined temperature by a heating furnace. Next, a nonwoven fabric 52a, which is to constitute the second layer 52 of the laminate 5, is placed on the resin sheet 51a.

Thereafter, the male mold 61 is moved downward, so that the resin sheet 51a and the nonwoven fabric 52a are simultaneously pressed at a predetermined pressure between the male mold 61 and the female mold 62, thereby shaping the resin sheet 51a and the nonwoven fabric 52a into a predetermined shape of the tray 2 or the cover 4. At this time, the resin constituting the resin sheet 51a that is located at a boundary portion with the nonwoven fabric 52a is further softened and melted by the pressing, penetrates between the fibers of the nonwoven fabric 52a, and entwines with the fibers, thereby combining with the nonwoven fabric 52a to be integrated.

The resin sheet 51a pressed between the male mold 61 and the female mold 62 is cured by being gradually cooled to a mold temperature, while undergoing shaping between the male mold 61 and the female mold 62. As a result, a product P of a predetermined shape is obtained which is formed of the laminate 5 in which the first layer 51 and the second layer 52 firmly laminated and integrated with each other. The obtained product P is machined into the tray 2 or the cover 4 through secondary machining such as trimming of the outer periphery and drilling of bolt holes.

According to the second production method, a lightweight laminate 5 having fire resistance and composed of the first layer 51 and the second layer 52 can be produced as an integrally molded article in a single step, as in the first production method. Thus, the number of steps of laminating the first layer 51 and the second layer 52 can be reduced. This feature makes it possible to easily produce the tray 2 and the cover 4 at reduced costs, the tray 2 and the cover 4 formed of the laminate 5 containing a thermoplastic resin.

Also, in the production method illustrated in FIG. 5, if the first layer 51 of the laminate 5 is constituted by a thermosetting resin, molds having a heating mechanism such as a heater are suitably used as the pair of upper and lower press molds (male mold 61 and female mold 62). The pressing can be suitably performed by placing the resin sheet 51a at room temperature on the female mold 62, placing the nonwoven fabric 52a on the resin sheet 51a, and thereafter by pressing the resin sheet 51a and the nonwoven fabric 52a using the male mold 61 and the female mold 62 while heating is performed so that the resin sheet 51a reaches the curing temperature.

As a result, a lightweight laminate 5 having fire resistance and formed of the first layer 51 and the second layer 52 can be produced as an integrally molded article in a single step, as in the method described above. Thus, the number of steps of laminating the first layer 51 and the second layer 52 can be reduced. This feature makes it possible to easily produce an in-vehicle battery containing body 1 at reduced costs, the in-vehicle battery containing body 1 being composed of a thermosetting resin and having the second layer 52 of a nonwoven fabric as the inner surface.

<Third Production Method>

Figure 6:
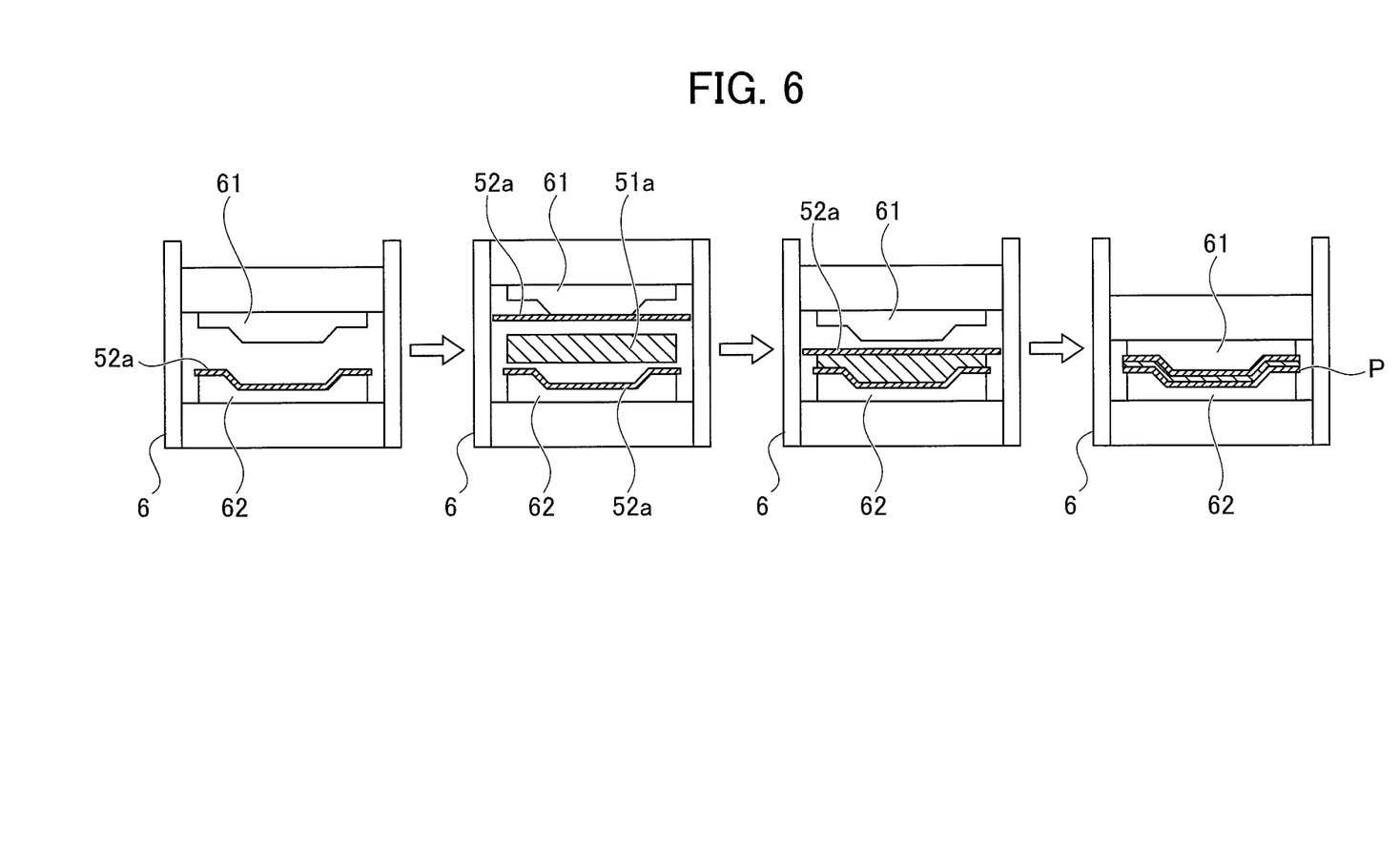
FIG. 6 illustrates yet another example of a step of producing a tray and a cover of an in-vehicle battery containing body using a press-molding machine.

FIG. 6 illustrates yet another example of a step of producing the tray 2 and the cover 4 for the in-vehicle battery containing body 1 using a press-molding machine 6.

A pair of upper and lower press molds (male mold 61 and female mold 62) of the press molding machine 6 is opened, and a nonwoven fabric 52a, which is to constitute the second layer 52 of the laminate 5, is set on the female mold 62. Next, a resin sheet 51a, which is to constitute the first layer 51 of the laminate 5, is placed on the nonwoven fabric 52a. Subsequently, another nonwoven fabric 52a, which is to constitute the other second layer 52 of the laminate 5, is further placed on the resin sheet 51a. The resin sheet 51a to be placed on the nonwoven fabric 52a has been softened by being heated in advance (preheated) for about one to two minutes to a predetermined temperature by a heating furnace emitting infrared rays or the like.

Thereafter, the male mold 61 is moved downward, so that the two nonwoven fabrics 52a and the one resin sheet 51a are simultaneously pressed (pressurized) at a predetermined pressure between the male mold 61 and the female mold 62, thereby shaping the nonwoven fabrics 52a and the resin sheet 51a into a predetermined shape of the tray 2 or the cover 4. At this time, the resin constituting the resin sheet 51a that is located at the boundary portions with the nonwoven fabrics 52a, 52a is further softened and melted by the pressing, penetrates between the fibers of the nonwoven fabrics 52a, 52a, and entwines with the fibers, thereby combining with the nonwoven fabrics 52a, 52a. Consequently, the resin sheet 51a is integrated with the nonwoven fabrics 52a, 52a.

The resin sheet 51a pressed between the male mold 61 and the female mold 62 is cured by being gradually cooled to a mold temperature, while undergoing shaping between the male mold 61 and the female mold 62. As a result, a product P is obtained which has the predetermined shape and formed of the laminate 5 containing the one first layer 51 and the two second layers 52, 52 firmly laminated and integrated with each other. The obtained products P is machined into the tray 2 or the cover 4 through secondary machining such as trimming of the outer periphery and drilling of bolt holes.

According to the third production method, since the three layers of the second layer 52, the first layer 51, and the other second layer 52 are simultaneously pressed and integrally molded with each other, a lightweight laminate 5 having fire resistance and composed of the three layers can be produced as an integrally molded article in a single step. Thus, the number of steps of laminating the three layers can be reduced. This feature makes it possible to easily produce an in-vehicle battery containing body 1 at reduced costs, the in-vehicle battery containing body 1 being composed of a thermoplastic resin and having fire resistance with respect to both the inside and outside.

Also, in the production method illustrated in FIG. 6, if the first layer 51 of the laminate 5 is constituted by a thermosetting resin, molds having a heating mechanism such as a heater are suitably used as the pair of upper and lower press molds (male mold 61 and female mold 62). The pressing can be suitably performed by placing the resin sheet 51a at room temperature on the nonwoven fabric 52a set on the female mold 62, further placing the other nonwoven fabric 52a on the resin sheet 51a, and thereafter, pressing the resin sheet 51a and the nonwoven fabrics 52a, 52a using the male mold 61 and the female mold 62, while heating is performed so that the resin sheet 51a reaches the curing temperature.

Since the three layers of the second layer 52, the first layer 51, and the other second layer 52 are thereby simultaneously pressed and integrally molded with each other as in the method described above, a lightweight laminate 5 having fire resistance and composed of the three layers can be produced as an integrally molded article in a single step. Thus, the number of steps of laminating the three layers can be reduced. This feature makes it possible to easily produce an in-vehicle battery containing body 1 at reduced costs, the in-vehicle battery containing body 1 being composed of a thermosetting resin and having fire resistance with respect to both the inside and outside.

Although the tray 2 and the cover 4 of the in-vehicle battery containing body 1 described above are entirely formed by the laminate 5, it is suitable so long as the laminate 5 constitutes at least a portion of the in-vehicle battery containing body 1. For example, only a portion of the tray 2 and/or the cover 4 that is particularly required to have fire resistance may be constituted by the laminate 5.

The laminate 5 of the present invention is not to be limited to applications to only the tray 2 and the cover 4 of the in-vehicle battery containing body 1 described above, and is also widely applicable to containers having fire resistance.

EXPLANATION OF REFERENCE NUMERALS

1 In-Vehicle Battery Containing Body
2 Tray (Containing Body)
3 Battery Module (In-Vehicle Battery)
4 Cover (Containing Body)
5 Laminate
51 First Layer
52 Second Layer
61 Male Mold (Press Mold)
62 Female Mold (Press Mold)

The invention claimed is:

1. An in-vehicle battery containing body comprising a tray and a cover for containing an in-vehicle battery, wherein
the tray and the cover are each constituted by a laminate including at least a first layer containing a thermoplastic or thermosetting resin and a second layer containing an incombustible nonwoven fabric,
the laminate is an integrally molded article including the first layer and the second layer integrated with each other through at least part of the resin of the first layer, the at least part of the resin being in contact with the second layer, having melted and penetrated between fibers of the nonwoven fabric constituting the second layer, and combining with the second layer, and
the tray and the cover each include an inner surface and an outer surface, and at least the outer surface of each of the tray and the cover is constituted by the nonwoven fabric constituting the second layer.

2. The in-vehicle battery containing body according to claim 1, wherein the thermoplastic or thermosetting resin is a fiber reinforced resin.

3. The in-vehicle battery containing body according to claim 1, wherein the nonwoven fabric is composed of graphite fibers.

4. The in-vehicle battery containing body according to claim 2, wherein the nonwoven fabric is composed of graphite fibers.

* * * * *